United States Patent [19]
Tabota et al.

[11] Patent Number: 5,515,725
[45] Date of Patent: May 14, 1996

[54] PIEZOELECTRIC BIMORPH TYPE ACCELERATION SENSOR

[75] Inventors: Jun Tabota; Jiro Inoue; Toshihiko Unami, all of Nagaokakyo, Japan

[73] Assignee: Murata Manufacturing Co., Ltd., Japan

[21] Appl. No.: 210,004

[22] Filed: Mar. 18, 1994

[30] Foreign Application Priority Data

Mar. 19, 1993 [JP] Japan .................................. 5-060144
Mar. 19, 1993 [JP] Japan .................................. 5-060145
Jul. 2, 1993 [JP] Japan .................................. 5-164577
Jul. 13, 1993 [JP] Japan .................................. 5-173018
Feb. 21, 1994 [JP] Japan .................................. 6-022454

[51] Int. Cl.$^6$ ............................................. G01P 15/09
[52] U.S. Cl. ............................. 73/574.34; 310/321
[58] Field of Search .................... 73/517 R, 505, 73/504; 310/329, 331, 364, 366

[56] References Cited

U.S. PATENT DOCUMENTS 2,614,416  10/1952  Hollmann .............................. 73/517 R
3,233,466  2/1966   Shaw, Jr. .............................. 73/517 R
3,304,787  2/1967   Chiku ................................... 73/517 R
4,431,935  2/1984   Rider .................................... 73/505
4,435,737  3/1984   Colton .................................. 73/517 R
4,689,992  9/1987   Strachan ............................... 73/517 R
5,088,326  2/1992   Wada et al. ........................... 73/517 R

FOREIGN PATENT DOCUMENTS

434878    7/1991   European Pat. Off. .
3817354   12/1988  Germany .

Primary Examiner—Hezron E. Williams
Assistant Examiner—Helen C. Kwok
Attorney, Agent, or Firm—Ostrolenk, Faber, Gerb & Soffen

[57] ABSTRACT

An acceleration sensor includes a sensor body obtained by forming first and second signal electrodes on outer major surfaces of first and second piezoelectric ceramic plates which are pasted to each other through an intermediate electrode. The sensor body is formed to be mechanically supported in the form of a center beam, and has first to third regions formed so that stress is caused in different directions in adjacent ones of the first to third regions upon acceleration. The first and second piezoelectric ceramic plates are polarized in opposite directions in the second region so that charges which are opposite in polarity to charges generated in the second region are not drawn from the signal electrodes in the first and third regions.

23 Claims, 8 Drawing Sheets

PIEZOELECTRIC BIMORPH TYPE ACCELERATION SENSOR

BACKGROUND OF THE INVENTION

1. Field of the Invention

The present invention relates to an acceleration sensor, and more particularly, it relates to an acceleration sensor which is formed by a bimorph piezoelectric element.

2. Description of the Background Art

In general, an acceleration sensor employing a bimorph piezoelectric element is known in the art. An example of such an acceleration sensor is now described with reference to FIG. 1. This acceleration sensor 1 is provided with a sensor body 2, which is formed by a bimorph piezoelectric element.

Figure 1:
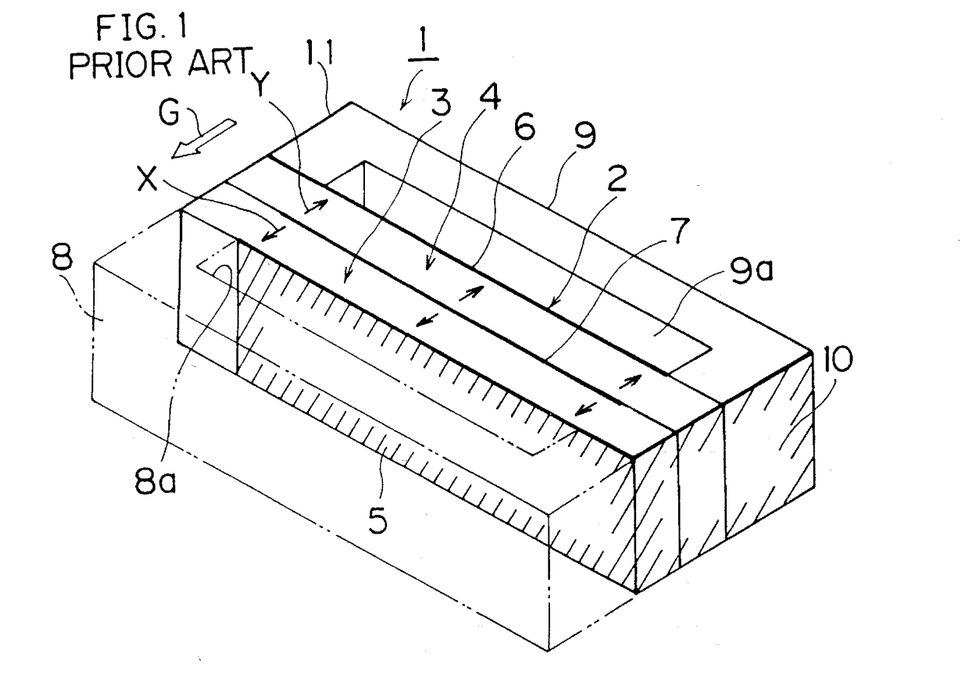
FIG. 1 is a perspective view for illustrating an exemplary conventional acceleration sensor.

The sensor body 2 comprises strip-shaped first and second piezoelectric ceramic plates 3 and 4, which are laminated to each other.

First and second signal electrodes 5 and 6 are formed on first major surfaces of the first and second piezoelectric ceramic plates 3 and 4, respectively. The first and second signal electrodes 5 and 6 are formed on the first major surfaces of the first and second piezoelectric ceramic plates to extend from a first edge toward a second edge, respectively, but not to reach the second edges. The first and second signal electrodes 5 and 6 are disposed opposite to each other in central regions through the first and second piezoelectric ceramic plates 3 and 4.

An intermediate electrode 7 is arranged between the first and second piezoelectric ceramic plates 3 and 4. The intermediate electrode 7 is formed to oppose the first and second signal electrodes 5 and 6, in portions where the first and second signal electrodes are opposed to each other.

The first and second piezoelectric ceramic plates 3 and 4 are uniformly polarized along arrows X and Y in FIG. 1, respectively. In other words, the first and second piezoelectric ceramic plates 4 and 5 are polarized in directions X and Y which are opposite to each other.

The sensor body 2 is held by first and second holding members 8 and 9 in portions which are close to both ends thereof. While FIG. 1 shows only the outline of the first holding member 8 in phantom lines, the first and second holding members 8 and 9 are fixed to the sensor body 2 on both ends thereof. The first and second holding members 8 and 9 are provided with cavities 8a and 9a between the portions which are fixed to the sensor body 2, respectively, in order to define spaces for allowing displacement of the sensor body 2.

The first and second holding members 8 and 9 form parts of a case holding the sensor body 2. In the structure shown in FIG. 1, a first terminal electrode 10 is formed on an outer surface of this case, i.e., on end surfaces of the sensor body 2 and the holding member 9, for example, and the first signal electrode 5 is electrically connected to the first terminal electrode 10.

Similarly, a second signal electrode 6 is electrically connected to a second terminal electrode 11 which is formed on other end surfaces of the sensor body 2 and the holding member 9.

When acceleration acts on the acceleration sensor 1 shown in FIG. 1 along arrow G, the sensor body 2 which is supported by the holding members 8 and 9 in the form of a center beam is deflected so that the first and second signal electrodes 5 and 6 detect a potential which is responsive to the acceleration on the basis of charges generated in response to the amount of deflection.

In recent years, further miniaturization is required for such an acceleration sensor. Thus, a sensor body which is incorporated in the acceleration sensor itself must also be miniaturized. If the aforementioned sensor body 2 is merely miniaturized, however, detection sensitivity is remarkably reduced due to reduction in amount of charges which are generated upon action of the acceleration G.

To this end, there has been proposed a structure of a sensor body which can be further deformed upon action of the same level of acceleration G thereby improving detection sensitivity. In an acceleration sensor 21 shown in FIG. 2, a sensor body 22 is supported in a cantilever manner between first and second holding members 18 and 19, which are similar in structure to the first and second holding members 8 and 9. The sensor body 22 is provided with first and second piezoelectric ceramic plates 23 and 24 which are pasted to each other, while first and second signal electrodes 25 and 26 are formed on first major surfaces of the piezoelectric ceramic plates 23 and 24, respectively. Further, an intermediate electrode 27 is formed between the piezoelectric ceramic plates 25 and 24.

Figure 2:
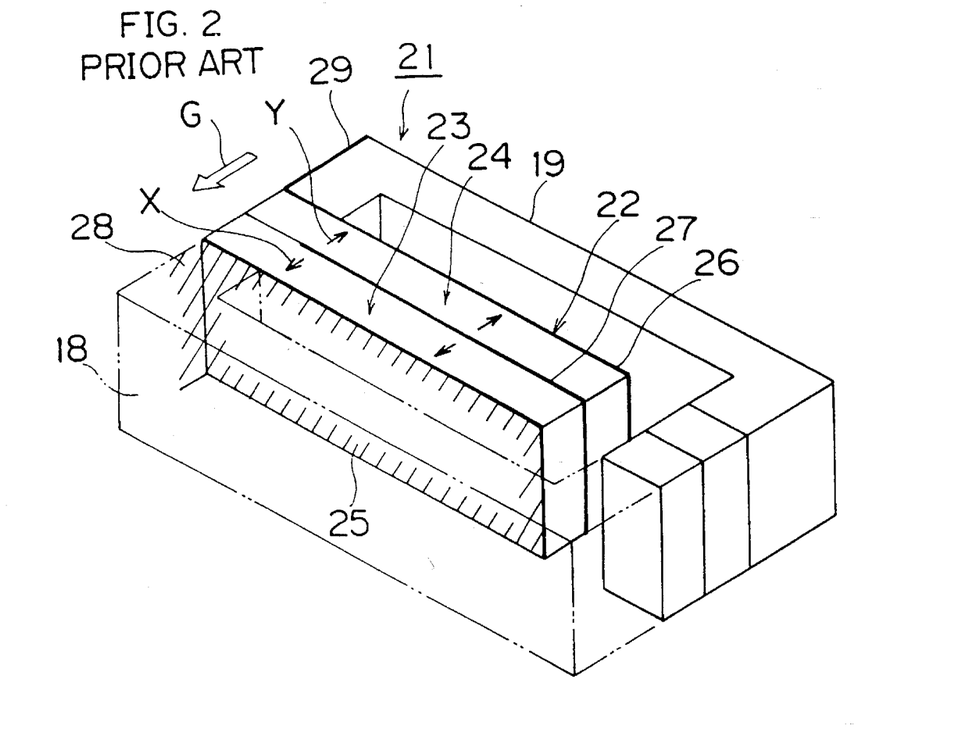
FIG. 2 is a perspective view for illustrating another exemplary conventional acceleration sensor.

In the acceleration sensor 21, the sensor body 22 is supported by the holding members 18 and 19 in a cantilever manner, whereby the first and second signal electrodes 25 and 26 are electrically connected to terminal electrodes 28 and 29 which are formed on first end surfaces of the holding members 18 and 19, respectively.

When acceleration acts on the acceleration sensor 21 along arrow G, the sensor body 22 which is supported in a cantilever manner can be further deformed as compared with that of the acceleration sensor 1 shown in FIG. 1. Thus, it is possible to improve detection sensitivity.

Figure 3:
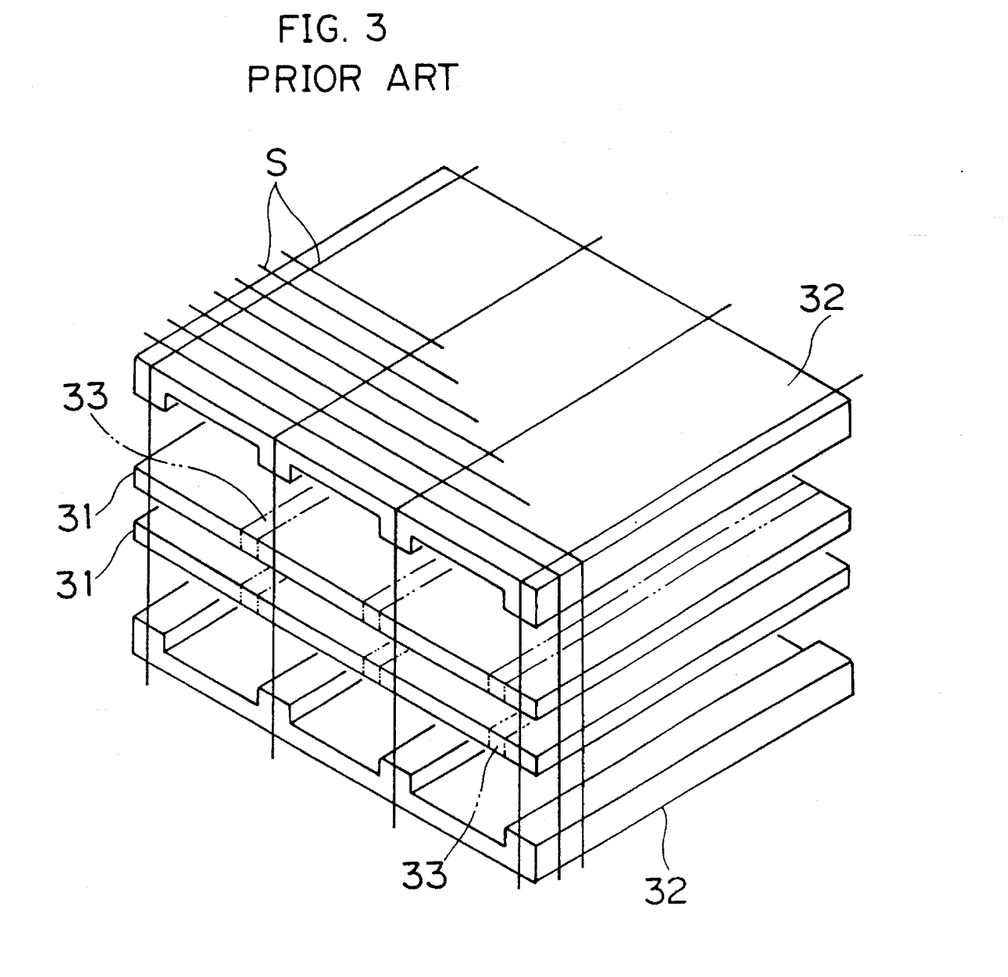
FIG. 3 is an exploded perspective view for illustrating steps of manufacturing the conventional acceleration sensors.

In order to manufacture the acceleration sensor 1 shown in FIG. 1, a pair of ceramic mother substrates 31 and another pair of ceramic mother substrates 32 for forming holding members are prepared as shown in FIG. 3. The ceramic mother substrates 31 are finally cut to form the first and second piezoelectric ceramic plates 3 and 4. The other pair of ceramic mother substrates 32 are adapted to form the holding members 8 and 9. Electrodes for forming signal electrodes and intermediate electrodes are provided on both major surfaces of the pair of ceramic mother substrates 51, which in turn are stacked with each other so that the other pair of ceramic mother substrates .352 are bonded to upper and lower portions thereof. An integrated structure obtained by such bonding is cut along cutting lines S shown in FIG. 3, to obtain the acceleration sensor 1 shown in FIG. 1.

On the other hand, the acceleration sensor 21 shown in FIG. 2 is manufactured by a method which is similar to the above. In this case, grooves 33 are formed in the ceramic mother substrates 31, as shown in FIG. 3. Each of these grooves 33 is adapted to release an end of the sensor body 22 in the acceleration sensor 21 shown in FIG. 2. In other words, each groove 33 is adapted to define a space for supporting the sensor body 22 in a cantilever manner. Thus, it takes much time to manufacture the acceleration sensor 21, since it is necessary to form the grooves 33 in the ceramic mother substrates 31. Further, the ceramic mother substrates 31 which are provided with the grooves 33 must be correctly aligned with each other, as well as, with the other pair of ceramic mother substrates 32 for forming holding members. Thus, it requires a long period of time to manufacture the acceleration sensor 21.

Because of the sensor body 22 being supported in a cantilever manner, impact resistance is reduced as compared with the center beam structure which results in a reduction in mechanical strength of the acceleration sensor 21. In addition, the terminal electrodes 28 and 29 for leading out the signal electrodes 25 and 26 to the exterior are exposed on the same end surface of the case in the acceleration sensor 21. In an ordinary electronic part, however, a pair of such terminal electrodes are generally exposed on different end surfaces which are opposed to each other. When a wiring board for mounting an ordinary electronic part is employed, therefore, a wiring pattern provided on the wiring board must be changed to accommodating the arrangement of the acceleration sensor 21.

SUMMARY OF THE INVENTION

In order to solve the aforementioned problems of the prior art, an object of the present invention is to provide an acceleration sensor which can attain improvement of detection sensitivity and miniaturization with excellent productivity.

According to a general aspect of the present invention, an acceleration sensor includes first and second piezoelectric ceramic plates each having a pair of opposite major surfaces, a first signal electrode formed on a first major surface of the first piezoelectric ceramic plate, a second signal electrode formed on a first major surface of the second piezoelectric ceramic plate, and an intermediate electrode arranged between second major surfaces of the first and second piezoelectric ceramic plates. The first and second piezoelectric ceramic plates are bonded to each other through the intermediate electrode to form the sensor body, which is mechanically held in portions close to both ends thereof. The sensor body has first to third regions so that stress is caused in different directions in adjacent ones of the regions upon action of acceleration while the first and second piezoelectric ceramic plates are polarized in opposite directions in the second region which is located at the center. The acceleration sensor further comprises means for preventing charges which are opposite in polarity to those generated in the second region from being drawn from the signal electrodes in the first and third regions.

In the acceleration sensor according to the present invention, the sensor body having the first and second piezoelectric ceramic plates is mechanically held in the portions which are close to both ends thereof. In other words, the sensor body is supported in the form of a center beam. Thus, it is possible to prevent the acceleration sensor from having reduced mechanical strength.

Further, the sensor body is supported in the form of a center beam, thereby forming first to third regions so that stress is caused in different directions in adjacent ones of the regions upon action of acceleration. In addition, the first and second piezoelectric ceramic plates are polarized in opposite directions in the second region which is located at the center, and the acceleration sensor further comprises the means for preventing charges which are opposite in polarity to those generated in the second region from being drawn from the signal electrodes in the first and third regions. When the sensor body which is supported in the form of a center beam is deflected, therefore, charges which are generated in response to stress caused by action of acceleration are drawn from the first and second signal electrodes in the second region which is located at the center, as clearly understood from embodiments of the present invention described later. In this case, no charges of opposite polarity are drawn from the signal electrodes in the first and third regions. Thus, it is possible to improve detection sensitivity as compared with the conventional acceleration sensor 1 shown in FIG. 1, as clearly understood from the preferred embodiments of the present invention described later.

Since the sensor body is supported by the holding members in the form of a center beam, further, it is possible to efficiently manufacture the inventive acceleration sensor as compared with the acceleration sensor 21 shown in FIG. 2, whose sensor body 22 is supported in a cantilever manner. While it is necessary to form the grooves 33 in the ceramic mother substrates 31 and to correctly align the ceramic mother substrates 31 and 32 with each other in the acceleration sensor 21 shown in FIG. 2, no formation of grooves is required and ceramic mother substrates can be easily aligned with each other in relation to the acceleration sensor according to the present invention.

According to the present invention, various structures are available for the means for preventing charges which are opposite in polarity to those generated in the second region from being drawn from the signal electrodes in the first and third regions.

According to a specific aspect of the present invention, for example, the first and second piezoelectric ceramic plates are polarized in the first and third regions in directions which are opposite to those in the second region while the first and second signal electrodes are so formed that portions which are opposed to each other through the first and second piezoelectric ceramic plates reach the first to third regions, whereby charges which are identical in polarity to those drawn in the second region are drawn from the first and second signal electrodes in the first and third regions. According to this structure, the charges which are identical in polarity to those drawn in the second region are drawn from the signal electrodes also in the first and third regions, whereby detection sensitivity can be further effectively improved.

According to another specific aspect of the present invention, the means for preventing charges which are opposite in polarity to those generated in the second region from being drawn from the signal electrodes in the first and third regions is in such a structure that the first and second signal electrodes are opposed to each other through the first and second piezoelectric ceramic plates only in the second region. In this case, charges which are generated by action of acceleration are drawn only in the second region. Since the first and second signal electrodes are not opposed in the first and third regions, no charges based on deflection are drawn from the signal electrodes upon deflection of the sensor body. Thus, it is possible to improve detection sensitivity as compared with the acceleration sensor 1 shown in FIG. 1, as clearly understood from the embodiments of the present invention described later.

When the aforementioned structure is employed so that the first and second signal electrodes are opposed to each other through the first and second piezoelectric ceramic plates only in the second region, the first and third regions may be or may not be polarized.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Preferred embodiments of the present invention are now described with reference to the drawings.

First Embodiment

Figure 4:
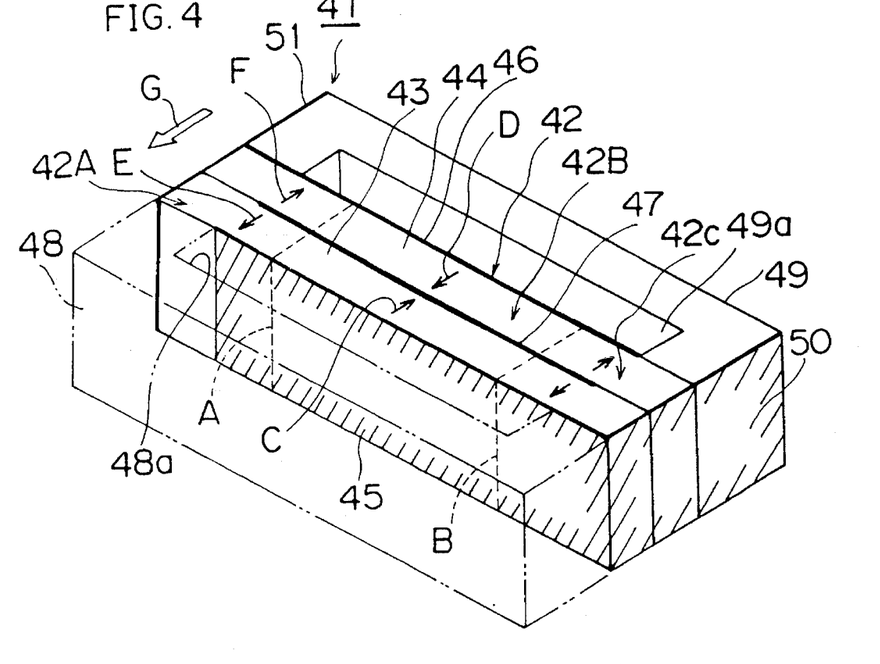
FIG. 4 is a perspective view for illustrating an acceleration sensor according to a first embodiment of the present invention.

FIG. 4 is a perspective view for illustrating an acceleration sensor 41 according to a first embodiment of the present invention. The acceleration sensor 41 has a sensor body 42 in its center. The sensor body 42 is formed by first and second piezoelectric ceramic plates 43 and 44, which are pasted to each other. The piezoelectric ceramic plates 43 and 44 are made of a ceramic material such as lead titanate zirconate piezoelectric ceramics, for example.

A first signal electrode 45 is formed on a first major surface of the first piezoelectric ceramic plate 43. The first signal electrode 45 is formed on the first major surface of the piezoelectric ceramic plate 43 so as to extend from a first end toward a second end, but not to reach the second end.

Similarly, a second signal electrode 46 is formed on a first major surface of the second piezoelectric ceramic plate 44. The second signal electrode 46 is formed on the first major surface of the piezoelectric ceramic plate 44 so as to extend from a first end toward a second end, but not to reach the second end. Further, an intermediate electrode 47 is arranged between the first and second piezoelectric ceramic plates 43 and 44. Namely, the piezoelectric ceramic plates 43 and 44 are bonded to each other through the intermediate electrode 47, to form the sensor body 42.

The first and second piezoelectric ceramic plates 43 and 44 forming the sensor body 42 are polarized along arrows shown in FIG. 4, as described later in detail.

In portions close to other ends of the sensor body 42, first and second holding members 48 and 49 are bonded to both sides of the sensor body 42. The first holding member 48, which is shown in phantom lines in FIG. 4, is bonded to the sensor body 42 in portions close to both ends of the sensor body 42, similarly to the second holding member 49. Further, the holding members 48 and 49 are provided with cavities 48a and 49a. These cavities 48a and 49a are adapted to allow deformation of the sensor body 42, which is supported by the holding members 48 and 49 in the form of a center beam, upon action of acceleration.

The sensor body 42 has first to third regions 42A, 42B and 42C along its longitudinal direction. Referring to FIG. 4, broken lines A and B show boundaries between the first to third regions 42A to 42C, respectively. The first and second signal electrodes 45 and 46 are formed to reach the first to third regions 42A to 42C.

Further, the first and second signal electrodes 45 and 46 are electrically connected to first and second terminal electrodes 50 and 51, respectively.

The boundaries A and B are set so that stress is caused in different directions in adjacent ones of the regions 42A to 42C when acceleration acts along G shown in FIG. 4. This is now described with reference to FIG. 5.

Figure 5:
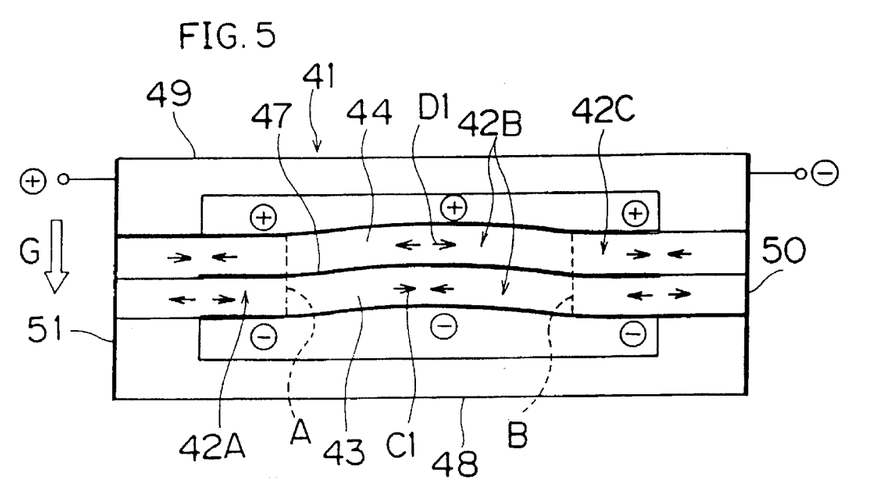
FIG. 5 is a plan view for illustrating charges which are generated in a sensor body when acceleration acts on the acceleration sensor according to the embodiment shown in FIG. 4.

When acceleration acts on the acceleration sensor 41 along arrow G as shown in FIG. 5 in a plan view, the case including the holding members 48 and 49 is moved along arrow G by this acceleration. At this time, the sensor body 42 is inertially deflected as shown in FIG. 5. Namely, the central portion of the sensor body 42 is deformed so that the second piezoelectric ceramic plate 44 protrudes into the space formed by the cavity 49A. In the second region 42B, therefore, the first piezoelectric ceramic plate 45 is compressed and the second piezoelectric ceramic plate 44 is expanded. FIG. 5 shows such compression and expansion by arrows C1 and D1, respectively. In the second region 42B, the first and second piezoelectric ceramic plates 43 and 44 are polarized in directions C and D which are opposite to each other, as shown in FIG. 4. Consequently, minus charges are generated on an outer major surface of the first piezoelectric ceramic plate 43, as shown in FIG. 5. On the other hand, plus charges are generated on an outer major surface of the second piezoelectric ceramic plate 44.

In the first region 42A, on the other hand, the first and second piezoelectric ceramic plates 43 and 44 are polarized along arrows E and F, respectively (see FIG. 4). In other words, the first and second piezoelectric ceramic plates 43 and 44 are polarized in opposite directions in the first region 42A. On the other hand, the first piezoelectric ceramic plate 43 is expanded and the second piezoelectric ceramic plate 44 is compressed in the first region 42A, as shown in FIG. 5. Also in the third region 42C, the first piezoelectric ceramic plate 43 is expanded and the second piezoelectric ceramic plate 44 is compressed, similarly to the first region 42A.

On the other hand, the first and second piezoelectric ceramic plates 43 and 44 are polarized in the first and third regions 42A and 42C in directions which are opposite to those in the second region 42B. In the first and third regions 42A and 42C, therefore, minus charges and plus charges are generated on the outer major surfaces of the first and second piezoelectric ceramic plates 43 and 44, respectively, for example. Consequently, the charges following deformation of the sensor body 42 are efficiently drawn from the signal electrodes 45 and 46.

In the acceleration sensor 41 according to this embodiment, charges which are identical in polarity to those generated in the second region 42B are drawn from the signal electrodes 45 and 46 also in the first and third regions 42A and 42C, whereby detection sensitivity can be improved as compared with the conventional acceleration sensor 1 shown in FIG. 1.

In the acceleration sensor 1 shown in FIG. 1, the first and second piezoelectric ceramic plates 3 and 4 are uniformly polarized along arrows X and Y, respectively. When acceleration acts along arrow G in FIG. 1 and the sensor body 2 is deformed similarly to the sensor body 42 shown in FIG. 5, therefore, the piezoelectric ceramic plates 3 and 4 are expanded and compressed similarly to the first to third regions 42A to 42C shown in FIG. 5. However, charges generated in a second region which is located at the center are opposite in polarity to those generated on the major surfaces of the piezoelectric ceramic plates 3 and 4 in first and third regions, since the first and second piezoelectric ceramic plates 3 and 4 are uniformly polarized. Consequently, plus charges which are generated on the outer major surface of the piezoelectric ceramic plate 3 are drawn from the signal electrode 5, for example, in the central region, while plus charges are canceled by minus charges generated in the first and third regions to reduce detection sensitivity, although these regions are less deformed.

In the acceleration sensor 41 according to this embodiment, on the other hand, charges which are identical in polarity to those generated in the second region 42B are generated on the major surfaces of the piezoelectric ceramic plates 43 and 44 also in the first and third regions 42A and 42C as hereinabove described, whereby detection sensitivity is remarkably improved.

Further, the sensor body 42 is supported in the form of a center beam by the first and second holding members 48 and 49 forming the case. Therefore, it is possible to improve mechanical strength as compared with the acceleration sensor 1 shown in FIG. 1.

Thus, it is possible to provide a miniaturized acceleration sensor which is excellent in detection sensitivity, as well as, in mechanical strength.

The acceleration sensor 41 according to this embodiment whose sensor body 42 is supported by the first and second holding members 48 and 49 in the form of a center beam can be easily manufactured through the ceramic mother substrates 31 and 32 shown in FIG. 3, similarly to the acceleration sensor 1 shown in FIG. 1. While the acceleration sensor 21 shown in FIG. 2 requires formation of the grooves 33 and complicated alignment of the ceramic mother substrates 31 and 32, the acceleration sensor 41 according to this embodiment can be manufactured with no requirement for such formation of the grooves 33 and complicated alignment of the ceramic mother substrates 31 and 32.

Second Embodiment

Figure 6:
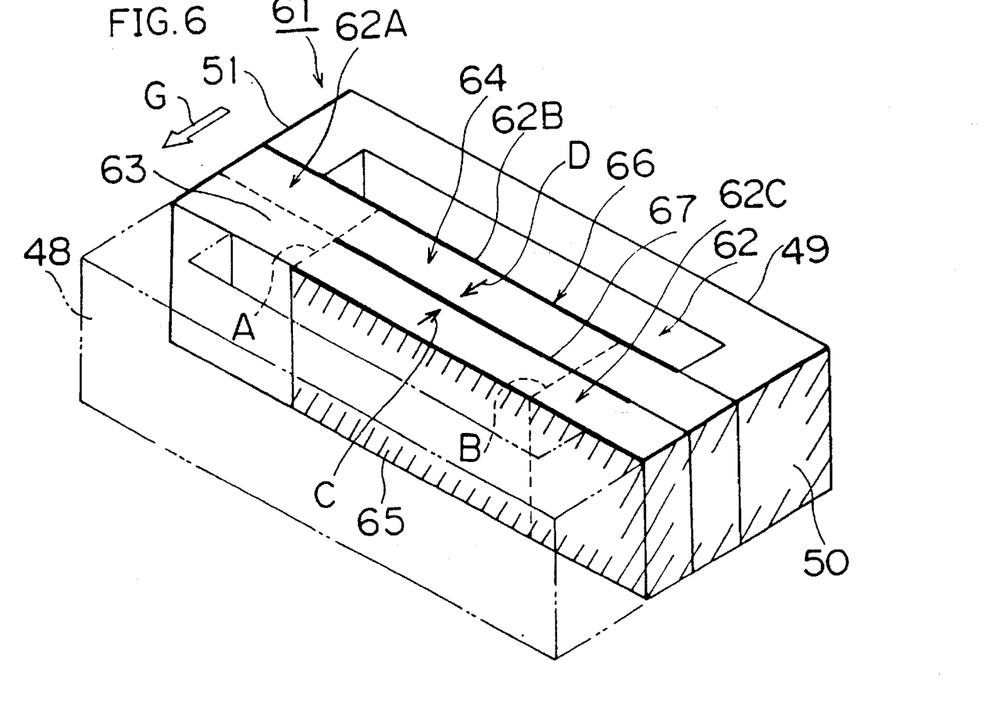
FIG. 6 is a perspective view for illustrating an acceleration sensor according to a second embodiment of the present invention.

FIG. 6 is a perspective view showing an acceleration sensor 61 according to a second embodiment of the present invention.

The acceleration sensor 61 is provided with a sensor body 62 in its center. The sensor body 62 is formed by first and second piezoelectric ceramic plates 63 and 64, which are pasted to each other. First and second signal electrodes 65 and 66 are formed on outer major surfaces of the first and second piezoelectric ceramic plates 63 and 64, respectively. Further, an intermediate electrode 67 is arranged between the piezoelectric ceramic plates 63 and 64. Namely, the first and second piezoelectric ceramic plates 63 and 64 are bonded to each other through the intermediate electrode 67, to form the sensor body 62.

In the acceleration sensor 61 according to the second embodiment, the first and second signal electrodes 65 and 66 and the intermediate electrode 67 are formed in portions which are different from those in the sensor body 42 of the acceleration sensor 41 according to the first embodiment. Further, the first and second piezoelectric ceramic plates 63 and 64 are polarized in a different manner to the piezoelectric ceramic plates 43 and 44 according to the first embodiment.

Except the sensor body 62, the second embodiment is similar in structure to the first embodiment, and hence portions identical to those of the first embodiment are denoted by the same reference numerals, to omit redundant description.

Figure 7:
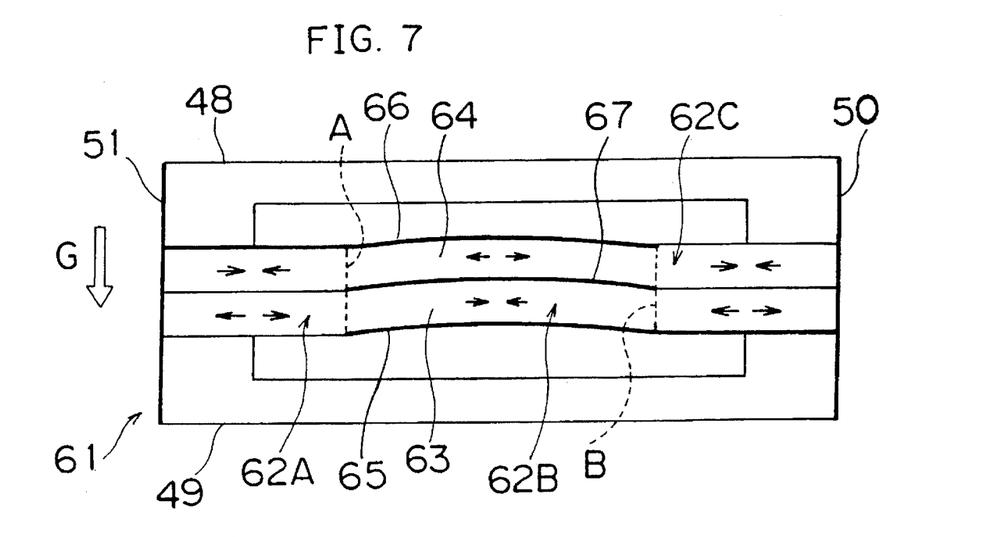
FIG. 7 is a plan view for illustrating a state of deflection of a sensor body upon action of acceleration on the acceleration sensor according to the embodiment shown in FIG. 6.

Also in the acceleration sensor 61 according to this embodiment, the sensor body 62 is deformed as shown in FIG. 7 in a plan view when acceleration acts along arrow G. Consequently, the piezoelectric ceramic plates 63 and 64 are displaced in different manners in first to third regions 62A to 62C, similarly to the first embodiment. Namely, the first piezoelectric ceramic plate 63 is expanded and the second piezoelectric ceramic plate 64 is compressed in the first region 62A. In the second region 62B, on the other hand, the first piezoelectric ceramic plate 63 is compressed and the second piezoelectric ceramic plate 64 is expanded. In the third region 62C, further, the piezoelectric ceramic plates 63 and 64 are displaced similarly to the first region 62A.

Referring again to FIG. 6, the first signal electrode 65 is formed not to reach the first region 62A beyond a boundary A in the acceleration sensor 61 according to this embodiment. Further, the second signal electrode 66 is formed on the outer major surface of the second piezoelectric ceramic plate 64 to extend from a first edge, but not beyond a boundary B. Therefore, the first and second signal electrodes 65 and 66 are opposed to each other through the piezoelectric ceramic plates 63 and 64 only in the second region 62B.

Further, the intermediate electrode 67 is also formed along the portions where the first and second signal electrodes 65 and 66 are opposed to each other. In other words, the intermediate electrode 67 is formed not to reach the first and third regions 62A and 62C.

On the other hand, the piezoelectric ceramic plates 63 and 64 are polarized as shown in FIG. 6 only in the second region 62B. Namely, the first and second piezoelectric ceramic plates 63 and 64 are polarized along arrows C and D in the second region 62B respectively. The piezoelectric ceramic plates 63 and 64 are not polarized in the first and third regions 62A and 62C.

When acceleration acts on the acceleration sensor 61 according to this embodiment along arrow G and the sensor body 62 is displaced as shown in FIG. 7, therefore, minus charges and plus charges are generated on outer major surfaces of the first and second piezoelectric ceramic plates 63 and 64, respectively, in the second region 62B, following such displacement of the piezoelectric ceramic plates 63 and 64. However, substantially no such charges are generated in the first and third regions 62A and 62C, since the piezoelectric ceramic plates 63 and 64 are not polarized in these regions.

In addition, the first and second signal electrodes 65 and 66 are opposed to each other only in the second region 62B, whereby only the charges generated in the second region 62B are drawn from the first and second signal electrodes 65 and 66.

While the conventional acceleration sensor 1 shown in FIG. 1 is reduced in detection sensitivity since charges which are opposite in polarity to those drawn in the second region are generated in the first and third regions, it is possible to effectively improve detection sensitivity in the acceleration sensor 61 according to the second embodiment of the present invention, since no charges of opposite polarity to those in the second region 62B are drawn from the signal electrodes 65 and 66 in the first and third regions 62A and 62C.

Also in the acceleration sensor 61 according to the second embodiment, the sensor body 62 is supported by the first and second holding members 48 and 49 in the form of a center beam similarly to the acceleration sensor 41 according to the first embodiment, whereby the acceleration sensor 61 is excellent in mechanical strength and can be efficiently manufactured as compared with the acceleration sensor 21 shown in FIG. 2.

Third Embodiment

Figure 8:
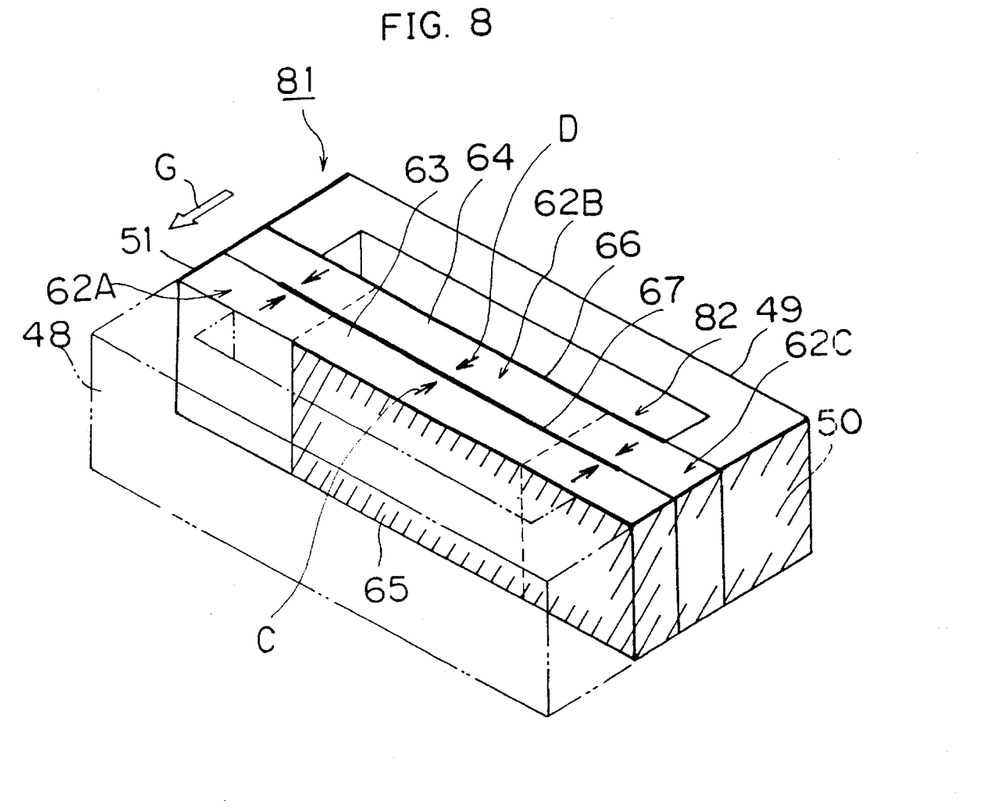
FIG. 8 is a perspective view for illustrating an acceleration sensor according to a third embodiment of the present invention.

FIG. 8 is a perspective view for illustrating an acceleration sensor 81 according to a third embodiment of the present invention.

The acceleration sensor 81 according to the third embodiment, which corresponds to a modification of the acceleration sensor 61 according to the second embodiment, is substantially similar in structure to the acceleration sensor 61. Therefore, only different points of this embodiment are now described and portions identical to those of the second embodiment are denoted by the same reference numerals, to omit redundant description.

In the acceleration sensor 81 according to the third embodiment, first and second piezoelectric ceramic plates 63 and 64 are pasted to each other in a sensor body 82 similarly to the second embodiment, while first and second signal electrodes 65 and 66 and an intermediate electrode 67 are formed also similarly to the second embodiment. This embodiment is different from the second embodiment in that first and third regions 62A and 62C are also polarized. Namely, the piezoelectric ceramic plates 63 and 64 are uniformly polarized along arrows C and D, respectively.

When acceleration acts on the acceleration sensor 81 according to the third embodiment along arrow G, therefore, the sensor body 82 is displaced similarly to that in the acceleration sensor 61 according to the second embodiment, while charges are generated on outer major surfaces of the piezoelectric ceramic plates 63 and 64, which are polarized also in the first and third regions 62A and 62C as described above. These charges are opposite in polarity to those generated on the outer major surfaces of the piezoelectric ceramic plates 63 and 64 in a second region 62B, similarly to the conventional acceleration sensor 1 shown in FIG. 1. Also in the third embodiment, however, the first and second signal electrodes 65 and 66 are opposed to each other through the piezoelectric ceramic plates 63 and 64 only in the second region 62B. Therefore, the charges which are generated in the first and third regions 62A and 62C are not drawn from the signal electrodes 65 and 66, whereby detection sensitivity can be effectively improved as compared with the conventional acceleration sensor 1.

Also in the acceleration sensor 81 according to the third embodiment, the sensor body 82 is supported by the first and second holding members 48 and 49 in the form of a center beam similarly to the second embodiment, whereby not only detection sensitivity but mechanical strength can be effectively improved. Further, the acceleration sensor 81 can be efficiently manufactured similarly to the conventional acceleration sensor 1 shown in FIG. 1, since the sensor body 82 is supported in the form of a center beam.

Fourth Embodiment

Figure 9:
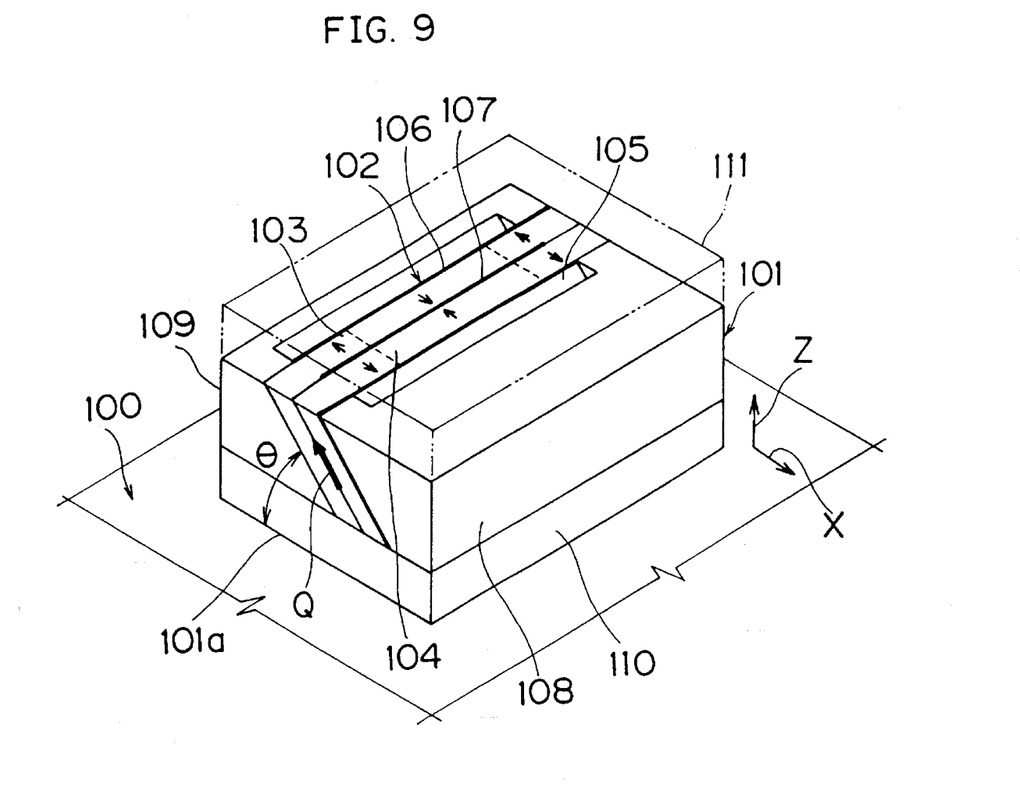
FIG. 9 is a perspective view for illustrating an acceleration sensor according to a fourth embodiment of the present invention.

FIG. 9 is a perspective view for illustrating an acceleration sensor 101 according to a fourth embodiment of the present invention, which is mounted on a substrate 100. The substrate 100 is that of an apparatus on which the acceleration sensor 101 is mounted, or an outer surface of a member of such a substrate, for example.

In each of the aforementioned acceleration sensors 41, 61 and 81 according to the first to third embodiments, acceleration acts along G in FIG. 4, for example. In this case, the sensor body 42 of the acceleration sensor 41 according to the first embodiment has excellent sensitivity for the acceleration which acts along the thicknesses of the first and second piezoelectric ceramic plates 43 and 44. When acceleration acts on the acceleration sensor 41 shown in FIG. 4 perpendicularly to or longitudinally along the sensor body 42, however, this acceleration cannot be detected. Namely, there is a specific insensitive direction along which no acceleration is detectable.

When the acceleration sensor 41 according to the first embodiment is fixed on a substrate in the direction shown in FIG. 4, therefore, it is impossible to detect acceleration which acts in one of directions which are perpendicular to the direction G.

The acceleration sensor 101 according to the fourth embodiment is adapted to solve the aforementioned problem, thereby enabling reliable detection of acceleration acting in a direction which is parallel or perpendicular to a mounting surface of the acceleration sensor 101.

The acceleration sensor 101 is provided with a sensor body 102 in its center, and the sensor body 102 is formed by first and second piezoelectric ceramic plates 103 and 104, which are pasted to each other. First and second signal electrodes 105 and 106 are formed on outer major surfaces of the first and second piezoelectric ceramic plates 103 and 104, respectively. Further, an intermediate electrode 107 is formed between the first and second piezoelectric ceramic plates 103 and 104. The piezoelectric ceramic plates 103 and 104 are polarized similarly to the first embodiment shown in FIG. 4. Namely, the first and second piezoelectric ceramic plates 103 and 104 are polarized along arrows in FIG. 9 in opposite directions so that directions of polarization are different from each other in adjacent ones of first to third regions, similarly to the first embodiment.

The feature of the acceleration sensor 101 according to the fourth embodiment resides in that the sensor body 102 is arranged to be inclined along a direction which is neither parallel nor perpendicular to a mounting surface, i.e., a bottom surface 101a of the acceleration sensor 101. In other words, the major surfaces of the piezoelectric ceramic plates 103 and 104 are inclined in the direction which is neither parallel nor perpendicular to the mounting surface 101a.

Since the sensor body 102 is inclined with respect to the mounting surface 101a, first and second holding members 108 and 109 which are arranged on outer sides of the sensor body 102 are also inclined in the same direction as the above in surfaces bonded to the sensor body 102.

A lower case member 110 is bonded to bottom surfaces of the sensor body 102 and the holding members 108 and 109. On the other hand, an upper case member 111, which is shown by phantom lines, is bonded to upper surfaces of the holding members 108 and 109 and the sensor body 102. The holding members 108 and 109 and the lower and upper case members 110 and 111 form a case of the acceleration sensor 101 according to this embodiment.

Action in the acceleration sensor 101 according to this embodiment is now described with reference to FIG. 10.

Figure 10:
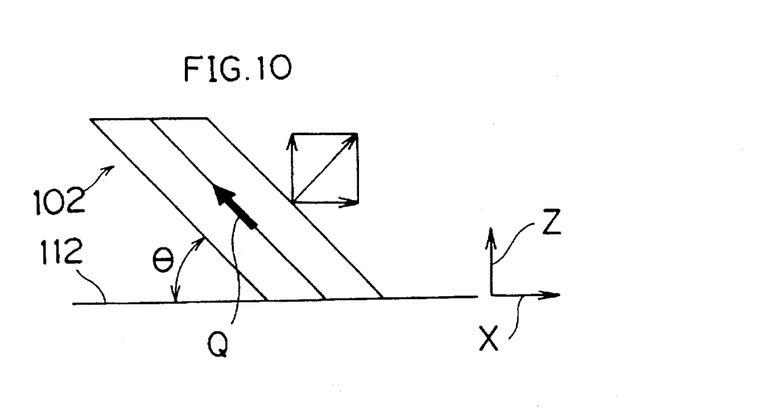
FIG. 10 is a side elevational view for illustrating an insensitive direction of a sensor body in the acceleration sensor shown in FIG. 9.

FIG. 10 is a typical side elevational view showing a side surface of the sensor body 102. As shown in FIG. 10, the sensor body 102 is inclined at an angle θ with respect to a plane 112 which is parallel to the mounting surface 101a. The angle θ of inclination is properly selected at 45°, for example, within a range of 0° to 90°, excluding 0° and 90°.

Since the sensor body 102 is inclined at the angle θ as described above, the acceleration sensor 101 has an insensitive direction along arrow Q in FIG. 9. Also when acceleration acts on the acceleration sensor 101 in a direction parallel to the mounting surface 101a along arrow X, the sensor body 102 detects this acceleration with detection sensitivity which is sinθ times the maximum detection sensitivity of the sensor body 102. When acceleration acts along arrow Z perpendicularly to the mounting surface 101a, on the other hand, this acceleration is detected with detection sensitivity which is cosθ times the maximum detection sensitivity.

Thus, the acceleration sensor 101 is so formed that the sensor body 102 is inclined at the angle θ as hereinabove described, whereby it is possible to reliably detect acceleration which acts in a direction perpendicular or parallel to the mounting surface 101a.

The aforementioned angle θ of inclination which is selected within the range of 0° to 90° excluding 0° and 90° is properly set in response to working conditions of the acceleration sensor 101 since detection sensitivity for acceleration acting along arrow X or Z is varied with the angle θ of inclination.

Exemplary steps of manufacturing the aforementioned acceleration sensor 101 are now described with reference to FIGS. 11A and 11B.

Figure 11A:
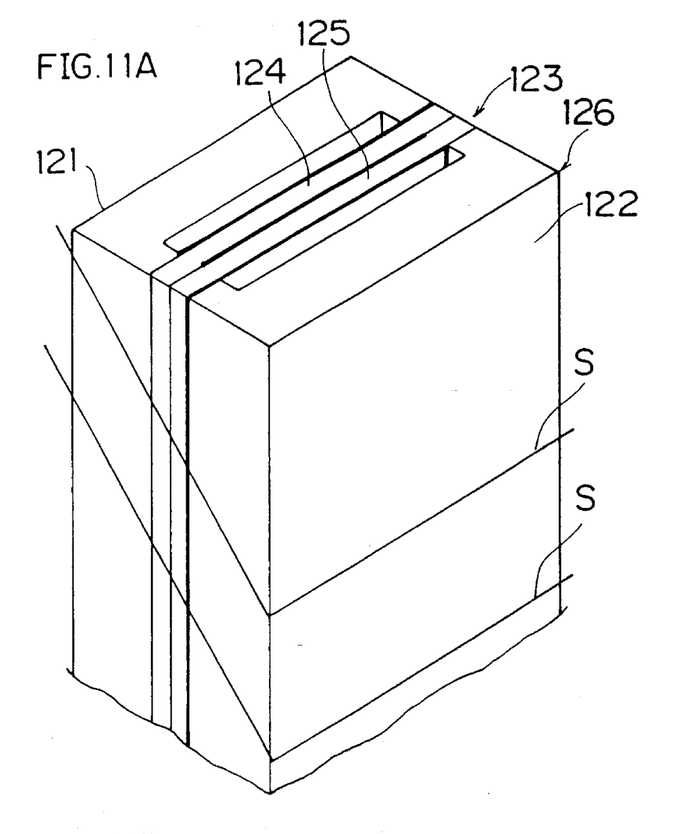
FIG. 11A is a perspective view for illustrating steps of manufacturing the acceleration sensor shown in FIG. 9.

First, a mother sensor body 123 is arranged between mother ceramic plates 121 and 122 for forming the holding members 108 and 109, as shown in FIG. 11A. The mother sensor body 123 is formed by mother piezoelectric ceramic plates 124 and 125, which are pasted to each other. Further, electrode patterns for forming the signal electrodes 105 and 106 and the internal electrode 107 are provided on both major surfaces of the mother piezoelectric ceramic plates 124 and 125, respectively. A mother laminate 126 obtained in the aforementioned manner is cut along cutting lines S1 and S2 shown in FIG. 11A, to obtain a structure shown in FIG. 11B.

Figure 11B:
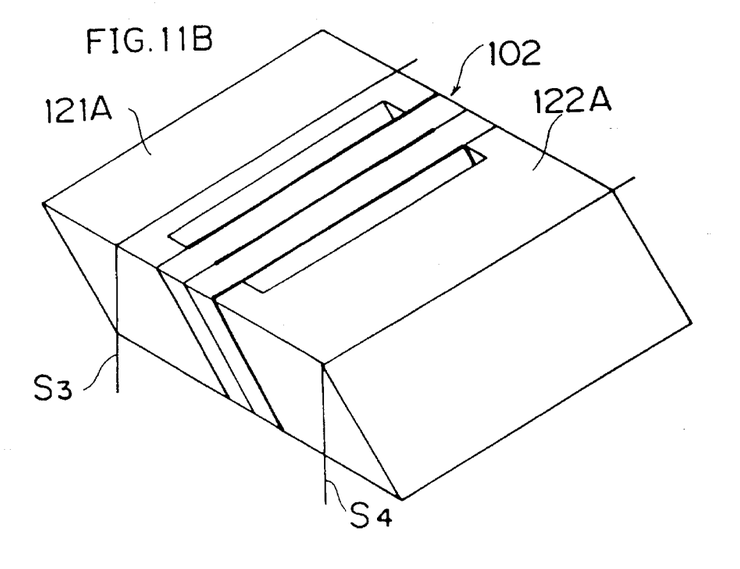
FIG. 11B is a perspective view for illustrating a principal part of the acceleration sensor obtained through the steps shown in FIG. 11A.

In the structure shown in FIG. 11B, mother ceramic substrate portions 121A and 122A are bonded to both sides of the sensor body 102. Then, this structure is cut along cutting lines S3 and S4 shown in FIG. 11B, to obtain such a structure that the holding members 108 and 109 shown in FIG. 9 are bonded to both sides of the sensor body 102. Thereafter the lower and upper case members 110 and 111 shown in FIG. 9 are bonded to this structure, thereby obtaining the acceleration sensor 101.

While polarization structures of the first and second piezoelectric ceramic plates 103 and 104 and the structures of the signal electrodes 105 and 106 and the intermediate electrode 107 are similar to those of the first embodiment in the sensor body 102 of the acceleration sensor 101 according to the fourth embodiment, the sensor body 102 may alternatively be formed in a similar manner to that in the second or third embodiment. Also in this case, it is possible to provide a miniature acceleration sensor having excellent mechanical strength, which can reliably detect acceleration acting in a direction perpendicular or parallel to the mounting surface, similarly to the fourth embodiment.

Another Exemplary Manufacturing Method

The sensor body is formed by the first and second piezoelectric ceramic plates which are pasted to each other through the intermediate electrode in each of the acceleration sensors according to the first to fourth embodiments, and such a structure can be obtained by pasting mother piezoelectric ceramic plates to each other, similarly to the conventional acceleration sensor 1. When such ceramic plates are pasted to each other through an adhesive, however, the adhesive may not necessarily adhere to the overall surfaces of the ceramic plates in uniform thicknesses. In other words, the ceramic plates may have portions provided with no adhesive, or those having adhesive layers in relatively excessive thicknesses in dispersion. In this case, the piezoelectric ceramic plates are not or insufficiently bonded to each other in a structure obtained by cutting a mother sensor body which is bonded with holding members or the like, leading to dispersion in detection accuracy.

Figure 12:
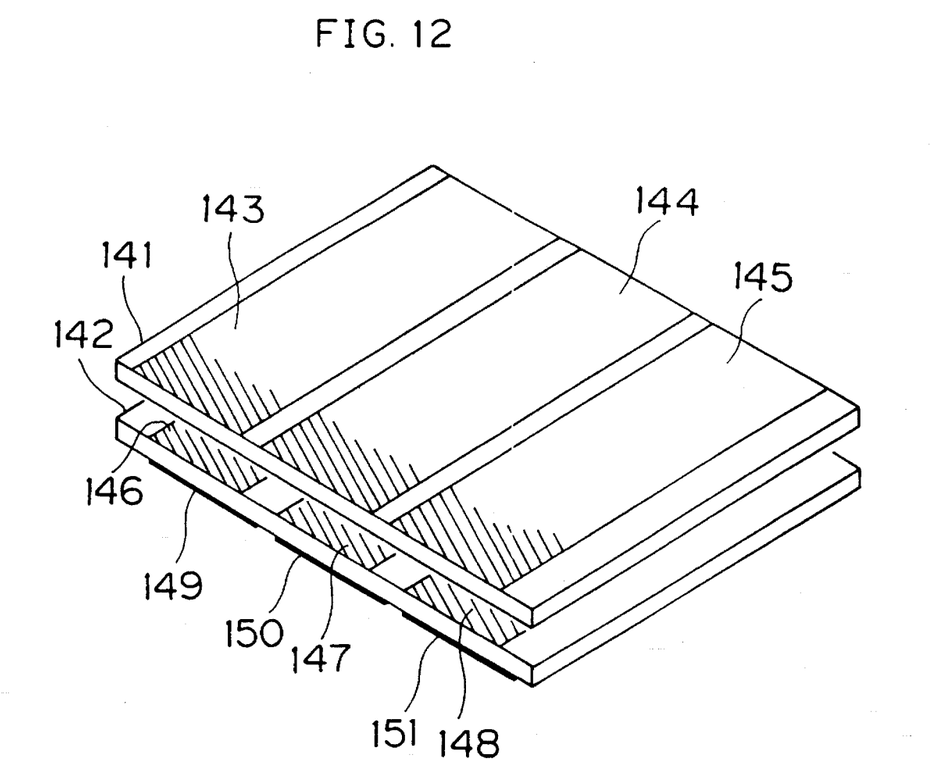
FIG. 12 is a perspective view for illustrating a preferred example of a method of manufacturing a sensor body.

FIG. 12 is a perspective view for illustrating a manufacturing method for solving the aforementioned problem of a sensor body which is formed by pasting piezoelectric ceramic plates to each other through an adhesive.

Referring to FIG. 12, ceramic green sheets 141 and 142 are prepared by forming ceramic slurry. Conductive films 143, 144 and 145 are formed on an upper surface of the ceramic green sheet 141 by application of conductive paste or a thin film forming method. Other conductive films 146 to 148 are formed also on an upper surface of the ceramic green sheet 142 in a similar manner to the above. On the other hand, further conductive films 149 to 151 are formed on a lower surface of the ceramic green sheet 142, also in a similar manner to the above. The conductive films 143 to 145 and 149 to 151 correspond to mother electrodes for forming the aforementioned signal electrodes, while the conductive films 146 to 148 correspond to mother electrode patterns for forming intermediate electrodes.

The ceramic green sheets 141 and 142 are stacked with each other and pressurized along thicknesses thereof, and thereafter cut along the thicknesses to form independent sensor bodies, thereby obtaining unfired sensor body chips. Thereafter the unfired sensor body chips are fired so as to obtain sintered bodies which can be employed as sensor bodies in the first to fourth embodiments. Namely, the method descried above with reference to FIG. 12 utilizes a well-known method of manufacturing a ceramic multilayer electronic part. Due to this manufacturing method, dispersion is hardly caused in bonding between the first and second piezoelectric ceramic plates, whereby it is possible to provide an acceleration sensor having small dispersion in detection sensitivity. Further, it is possible to form a smaller sensor body by utilizing the aforementioned method of manufacturing a ceramic multilayer electronic part.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An acceleration sensor comprising:

first and second piezoelectric ceramic plates each having first and second major surfaces;

a first signal electrode being formed on said first major surface of said first piezoelectric ceramic plate;

a second signal electrode being formed on said first major surface of said second piezoelectric ceramic plate; and an intermediate electrode being arranged between said second major surfaces of said first and second piezoelectric ceramic plates, said first and second piezoelectric ceramic plates being bonded to each other with said intermediate electrode located therebetween so as to form a sensor body, said sensor body being mechanically held at locations along said sensor body close to both ends of said sensor body, said sensor body having first, second and third regions located along a length of said sensor body and formed so that stress is caused in different directions in adjacent regions of said first, second and third regions upon an acceleration force acting on said sensor body, said first and second piezoelectric ceramic plates being polarized in opposite directions in said second region, said second region being located at a center of said sensor body, said acceleration sensor further comprising means for preventing first charges which are opposite in polarity to second charges generated in said second region from being drawn from said signal electrodes in said first and third regions of said sensor body, wherein said first and second charges are generated by acceleration acting on said sensor body.

2. An acceleration sensor in accordance with claim 1, wherein said first and second piezoelectric ceramic plates are polarized in said first and third regions in directions opposite to a direction of polarization of said second region, and said first and second signal electrodes are formed so that portions of said first and second signal electrodes that are disposed opposite to each other through said first and second piezoelectric ceramic plates reach said first, second and third regions, whereby charges which are identical in polarity to said charges generated in said second region are drawn from said first and second signal electrodes in said first and third regions.

3. An acceleration sensor in accordance with claim 2, further comprising first and second holding members being fixed to said sensor body on both ends thereof for holding said sensor body from both sides along thicknesses of said first and second piezoelectric ceramic plates.

4. An acceleration sensor in accordance with claim 3, further comprising cavities formed in each of said holding members defining spaces for allowing displacement of said piezoelectric ceramic plates, each of said holding members being bonded to said first and second piezoelectric ceramic plates.

5. An acceleration sensor in accordance with claim 2, further comprising a case member for holding said sensor body, said sensor body being held by said case member so that an insensitive direction of said sensor body is inclined neither in parallel with nor perpendicularly to a surface of said case member being mounted on an external device.

6. An acceleration sensor in accordance with claim 5, wherein said case member comprises first and second holding members being fixed to said sensor body on both ends thereof for holding said sensor body from both sides along thicknesses of said first and second piezoelectric ceramic plates.

7. An acceleration sensor in accordance with claim 2, wherein said sensor body is formed by a sintered body obtained by stacking first and second ceramic green sheets with said intermediate electrode located therebetween to form a stack to be sintered and firing the stack to be sintered to form said sensor body.

8. An acceleration sensor in accordance with claim 1, wherein said means for preventing charges which are opposite in polarity to said charges generated in said second region from being drawn from said signal electrodes in said first and third regions is formed so that said first and second signal electrodes are opposed to each other only in said second region.

9. An acceleration sensor in accordance with claim 8, wherein said first and third regions are not polarized.

10. An acceleration sensor in accordance with claim 9, further comprising first and second holding members being fixed to said sensor body on both ends thereof for holding said sensor body from both sides along thicknesses of said first and second piezoelectric ceramic plates.

11. An acceleration sensor in accordance with claim 9, further comprising cavities formed in each of said holding members defining spaces for allowing displacement of said piezoelectric ceramic plates, each of said holding members being bonded to said first and second piezoelectric ceramic plates.

12. An acceleration sensor in accordance with claim 9, further comprising a case member for holding said sensor body, said sensor body being held by said case member so that an insensitive direction of said sensor body is inclined neither in parallel with nor perpendicularly to a surface of said case member being mounted on an external device.

13. An acceleration sensor in accordance with claim 12, wherein said case member comprises first and second holding members being fixed to said sensor body on both ends thereof for holding said sensor body from both sides along thicknesses of said first and second piezoelectric ceramic plates.

14. An acceleration sensor in accordance with claim 9, wherein said sensor body is formed by a sintered body obtained by stacking first and second ceramic green sheets on each other having said intermediate electrode located therebetween to form a stack to be sintered and firing the stack to be sintered to form said sensor body.

15. An acceleration sensor in accordance with claim 8, wherein said first and second piezoelectric ceramic plates are uniformly polarized along thicknesses thereof.

16. An acceleration sensor in accordance with claim 15, further comprising first and second holding members being fixed to said sensor body on both ends thereof for holding said sensor body from both sides along thicknesses of said first and second piezoelectric ceramic plates.

17. An acceleration sensor in accordance with claim 16, further comprising cavities formed in each of said holding members defining spaces for allowing displacement of said piezoelectric ceramic plates, each of said holding members being bonded to said first and second piezoelectric ceramic plates.

18. An acceleration sensor in accordance with claim 15, further comprising a case member for holding said sensor body, said sensor body being held by said case member so that an insensitive direction of said sensor body is inclined neither in parallel with nor perpendicularly to a surface of said case member being mounted on an external device.

19. An acceleration sensor in accordance with claim 18, wherein said case member comprises first and second holding members being fixed to said sensor body on both ends thereof for holding said sensor body from both sides along thicknesses of said first and second piezoelectric ceramic plates.

20. An acceleration sensor in accordance with claim 15, wherein said sensor body is formed by a sintered body obtained by stacking first and second ceramic green sheets on each other with said intermediate electrode located therebetween to form a stack to be sintered and firing the stack to be sintered to form the sensor body.

21. An acceleration sensor comprising:

first and second piezoelectric ceramic plates each having first and second major surfaces;

a first signal electrode being formed on said first major surface of said first piezoelectric ceramic plate;

a second signal electrode being formed on said first major surface of said second piezoelectric ceramic plate; and an intermediate electrode being arranged between said second major surfaces of said first and second piezoelectric ceramic plates, said first and second piezoelectric ceramic plates being bonded to each other with said intermediate electrode located therebetween so as to form a sensor body, said sensor body having first, second and third regions located along a length of said sensor body and formed so that stress is caused in different directions in adjacent regions of said first, second and third regions upon an acceleration force acting on said sensor body; wherein said sensor body is formed so that first charges which are opposite in polarity to second charges generated in said second region are not drawn from said signal electrodes in said first and third regions of said sensor body, wherein said first and second charges are generated by acceleration acting on said sensor body.

22. The acceleration sensor of claim 21, wherein said first and second piezoelectric ceramic plates are polarized in opposite directions in said second region, said second region being located at a center of said sensor body, said first and second piezoelectric ceramic plates being polarized in said first and third regions in directions opposite to a direction of polarization of said second region.

23. The acceleration sensor of claim 21, further comprising first and second holding members fixed to said sensor body for holding said sensor body from both sides at locations extending along thicknesses of said first and second piezoelectric ceramic plates, each of said first and second holding members having cavities formed therein defining spaces for allowing displacement of said first and second piezoelectric ceramic plates.

* * * * *